Feb. 17, 1931.   D. M. WINANS   1,792,671
MIRRORSCOPE FOR VEHICLES
Filed Aug. 22, 1927
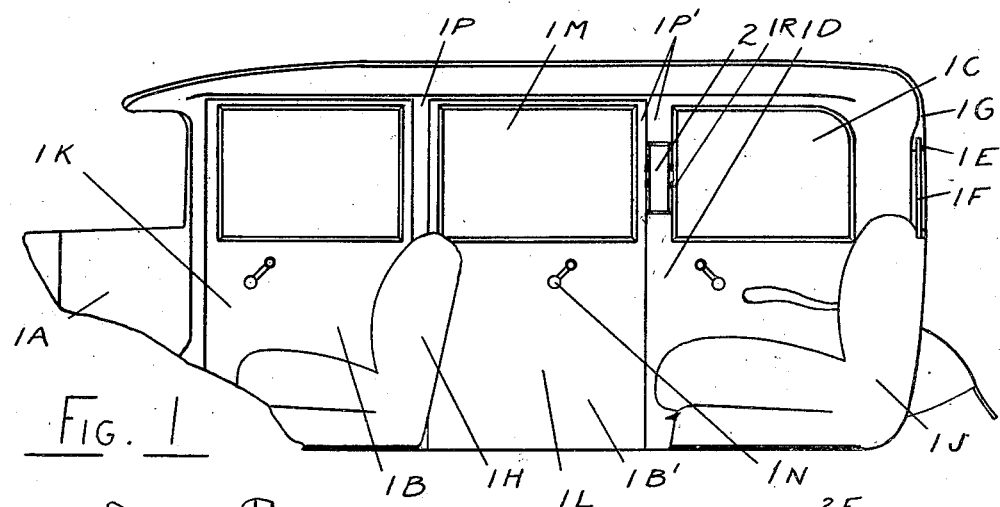
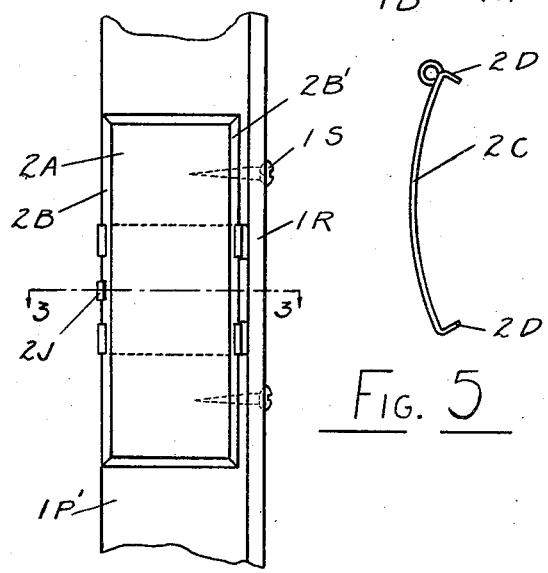
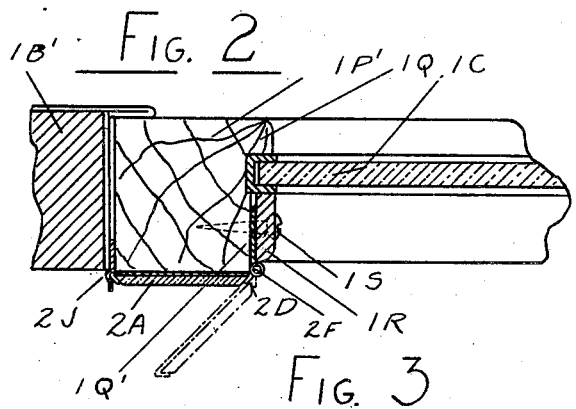
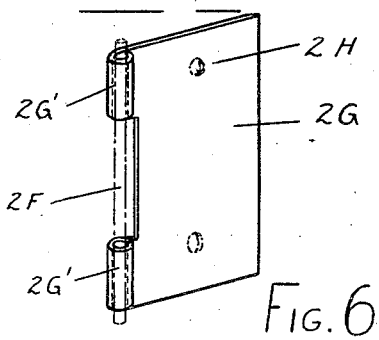
DANIEL M. WINANS
INVENTOR.
BY Louis Illmer
ATTORNEY.

Patented Feb. 17, 1931

1,792,671

UNITED STATES PATENT OFFICE

DANIEL M. WINANS, OF BINGHAMTON, NEW YORK, ASSIGNOR TO THE BREWER-TITCHENER CORPORATION, OF CORTLAND, NEW YORK, A CORPORATION OF NEW YORK

MIRRORSCOPE FOR VEHICLES

Application filed August 22, 1927. Serial No. 214,462.

My invention more particularly relates to devices by means of which passengers riding in the rear seat of a closed body type of motor car may at all times have available for vanity and for rear-view purposes, a mirror conspicuously placed in novel location along the interior of a car side-wall.

The object of the present invention is to provide for a mirror of this character that shall readily be attachable without marring the trim finish of a motor car so equipt. It is a further purpose to swivelly mount such mirrors to swing upon a support that is especially designed to be clamped between the regular conventional door or side window sash parts of a non-collapsible vehicle top.

In the preferred embodiment, my mounting devices essentially comprise two pivotally connected strap-like members of which one is fashioned into a resilient backing member and provided with spaced retractable claw means serving to firmly grip opposite edges of a relatively narrow mirror while the other strap member is kept rather thin and flat so as to facilitate interposing the same between the window sash and its adjacent removable stop strip such as are commonly used for pane retaining purposes. In order to mount my mirror, it is merely necessary to loosen the usual strip screws to allow of opening a narrow slot therebehind for the reception of my clamped support. This exceedingly simple and effective mode of attachment greatly expedites the installation of such mirrors in substantially all of the prevailing makes and models of closed motor cars.

Said swivel type of mirror may thus be readily mounted adjacent to the sash of any car body window and particularly along a side-wall portion lying intermediate the two cross-seats of a sedan or limousine. By locating my device at a height to fall into virtual alignment with the back window pane, my mirror may be swung rearward to face said pane and thus serve as a rear-view reflector for the back seat occupants. When not so used, said reflecting surface may be folded back into alignment with the body side-wall in which normal position it is admirably suited to provide for a neat and convenient mirror for toilet or similar purposes.

The present invention further contemplates the use of an improved and simplified claw mounting that is especially adapted to retain mirror strips, there being a resilient bow-shaped backing plate provided which allows its attached complementary claws to accommodate themselves to the width of said strip edges and to snugly clamp the mirror therebetween. Other objects and advantages reside in novel constructive features, combination and disposition of parts, all of which will hereinafter be more fully set forth.

Reference is had to the accompanying drawings which are illustrative of a specific embodiment of my invention as applied to motor vehicle purposes, in which like characters of reference indicate like parts in the several views, and in which:

Fig. 1 is a fragmental interior view in section showing a closed body vehicle with my device positioned for use.

Fig. 2 represents an enlarged assembly detail of my device while Fig. 3 is a sectional view thereof as taken along line 3—3 of Fig. 2.

Figs. 4 and 5 show respective views of a suitable backing member for mounting my mirror plate therein, while Fig. 6 is a perspective detail of a bracket member adapted to hingedly support said backing member.

Referring to the drawings, 1A is intended to indicate a closed body of an automobile or the like, in which 1B and 1B′ represent adjoining windowed side-doors thereof, 1C an adjacent rearward side-window as disposed in the body side-wall 1D, while 1E is a similar back window having a transparent pane 1F lying in the transversely disposed rear wall 1G. The car body may further be provided with spaced front and back cross-seats 1H and 1J respectively, such that the body compartment is thereby divided into front quarters 1K and rear quarters 1L.

Each of said doors may be provided with slidable window panes such as 1M which in turn may be actuated by means of a regulator 1N. The rearward side-window 1C may be similarly equipt, and all such body window panes are now generally guided within sash members and particularly between a pair of complementary upright jamb posts such as 1P and 1P'. The inner margin 1Q of such sash parts is usually made to overlap the outer side of the pane, the pane then being conventionally held thereagainst by separate regular stop or conventional retaining strips 1R which are in turn demountably screwed in place by one or more spaced screws such as 1S. My elongated mirror and bracket designated in its entirety as 2 in Fig. 1, is preferably disposed lengthwise of a window sash part such as 1P' and supported against inner transverse sash face 1Q' thereof, the mirror by virtue of its hinge connection being adapted to close in alongside the side-wall 1D and to swing rearwardly therefrom into any skewed position such as is represented by dotted lines in Fig. 3.

Referring now in detail to the outstanding structural features of my device, this may comprise a relatively narrow plate glass mirror or like reflecting surface 2A provided with complementary bevelled longitudinal edges 2B and 2B'. A rectangular backing plate 2C preferably fashioned as a stamping from resilient sheet metal is initially given a transversely bowed or dished profile such as is shown in Fig. 5. Each edge measured lengthwise of said plate is here equipt with a pair of overhung clincher prongs or gripping claws 2D located adjacent to the respective corner portions of said plate 2C and integrally disposed between one pair of such claws is a pintle socket 2E adapted to mount the hinge pintle 2F.

Said claws are respectively inturned toward the concave side of said plate as shown in Fig. 5 and adapted to yieldingly grip the bevelled edges of the mirror strip 2A. While inserting the mirror into its backing member for initial assembly or for replacement purposes, it is preferred to manipulate the curved body of the plate 2C so as to spring the same into a substantially flat condition which causes the complementary claws to spread apart and thus facilitates entering the narrow mirror therethrough; when relieved of such springing manipulation, said claws are allowed to retract and tightly grip the opposite mirror edges and this results in clamping effect that is sufficient to hold the mirror in place without need of additional securement or adjustment of any kind.

Adapted to cooperate and form a knuckle or hinge joint with said pintle 2F, is a leaf or strap-like bracket member 2G preferably curled over into a pair of aligned pintle tubes 2G' as disposed along one of said member edges in the fashion shown by Fig. 6. Said strap may be provided with one or more holes 2H by means of which my mirror bracket may be screwed on to any suitable supporting means but such holes are not needed for vehicle purposes when said strap 2G is clamped in place behind a window stop strip in the preferred manner illustrated in Fig. 3. Here said strap is interposed between the transverse sash face 1Q' and its contiguous stop strip 1R. As stated, the latter strip may be drawn to the face 1Q' by the spaced screws 1S, and by partially withdrawing such fastenings, my relatively thin and flat strap may be inserted into clamping position intermediate any such loosened screws without having to actually remove the regular conventional strip 1R. It is preferred to clamp only the flat wing portion of said strap and to have its tube portion overhang the sash so as to project over the body side-wall with the pintle axis standing in substantial alignment with a corner of the sash jamb post 1P'.

In the embodiment here disclosed, the mirror plate 2A is intended to swing on its vertically disposed pintle 2F about its stationary support strap 2G. Where the width of the mirror strip is made to coincide and fit across the upright post 1P' as shown in Fig. 2, the mirror when swung into abutment with the inside body wall 1D, may be snapped and held in place by means of a resilient clip such as 2J. It is preferred however to make the pintle knuckle joint rather stiff in action for the purpose of firmly holding the reflecting surface in any desired angular relation against car vibration without need of any supplementary hinge locking device.

When said mirror is swung outwardly into an oblique position relatively to the supporting side-wall 1D to partially face the back window 1E, then any lighted image projected through the transparent pane 1F when impinging upon my reflective surface, may be thrown rearward into line of vision of the rear seat occupants, thus serving as rear-view mirror for the rear quarters 1L and supplementing any similar mirror devices such as are conventionally located in the front quarters for the sole benefit of the driver. Said double rear-view mirror provision is intended to insure greater driving safety especially when touring in crowded or high-speed traffic.

It is further pointed out that my strap type of hinge joint allows the mirror plate and its bracket parts to be compactly folded together for packing the same in a relatively small flat carton or other shipping container.

While a preferred embodiment and disposition of my devices has been herein disclosed, it will be understood that various changes in the details and arrangements of my mirrorscope may be resorted to since it is adapted to a variety of similar purposes, it being evident that a ball and socket type of swivel joint or the like may be substituted for a pintle style of hinge, all without departing from the spirit and scope of my invention heretofore described and more particularly pointed out in the appended claims.

I claim:

1. In a device of the character described adapted to be disposed within a vehicle body that is provided with an interior vertical side-wall having a window, a regular stop-strip associated with the window jamb, an adjoining transverse rear body wall having a transparent back pane disposed therein, and a front quarter and a rear quarter respectively equipt with a separate cross-seat for vehicle occupants, said device comprising support means including a strap-like member adapted to be interposed between said strip and its jamb and which means is carried by that portion of said side-wall lying forward of the rear seat, and a mirror swivelly mounted upon said support to move in angular relation with respect to said side-wall such that an image projected through said pane will be reflected back into line of vision of the rear-seat occupants to the exclusion of the front seat occupants.

2. In a device of the character described adapted to be disposed within a vehicle body and which body is provided with an interior vertical wall equipt with a window pane encased by transversely disposed sash means having a regular conventional stop strip located interiorly of said pane and removably adjoined to a sash portion, said device comprising a relatively thin strap member of which a portion is interposed between said strip and its adjoining sash and clamped beneath said strip while another strap portion projects into the interior of said body, and a reflecting surface pivotally mounted upon the projecting portion of said strap adapted to move into and out of alignment with said wall.

3. In a device of the character described adapted to be disposed within a vehicle body and which body is provided with an interior vertical wall equipt with a window pane encased by transversely disposed sash means having a regular conventional stop strip located interiorly of said pane and secured to a sash portion by screw means, said device comprising a strap member carrying a pintle and of which member a portion is interposed between said strip and said sash and clamped in place underneath the strip by the screw means, and a mirror mounted upon said pintle adapted to close in against said wall and to swing outwardly therefrom.

4. In a device of the character described adapted to be disposed within a vehicle body and which body is provided with an interior wall equipt with a window pane encased by sash means having a regular conventional stop strip disposed interiorly of said pane and retractably fastened alongside a sash portion and which strip when partially loosened serves to provide for a slot opening with respect to its adjacent sash portion, said device comprising bracket means having a relatively thin plate portion adapted to be inserted into said slot and also having a non-enterable projecting portion serving as a support means, said inserted plate portion being clamped in place by tightening up said fastening means, and a reflecting member mounted upon said support.

5. In a device of the character described adapted to be disposed within a vehicle body equipt with a window encased by sash and stop strip means, said device comprising a relatively narrow mirror plate having spaced longitudinal edges, a backing member equipt with a pair of resiliently mounted gripping claws for each of the respective mirror edges and a pintle socket formed integral with said member and disposed between one pair of such claws, and a flat strap member provided with complementary sockets adapted to straddle the first named pintle socket and form a knuckle joint therewith, said strap being secured alongside said window sash in an interposed relation to the strip thereof with the mirror overhangingly mounted to swing across the plane of said strap.

In testimony whereof, I have herewith set my hand this 19th day of August, 1927.

DANIEL M. WINANS.